March 12, 1968     K. KROHNCKE     3,372,757
ROTOR BLADE AND METHOD OF FABRICATING THE SAME
Filed July 13, 1965
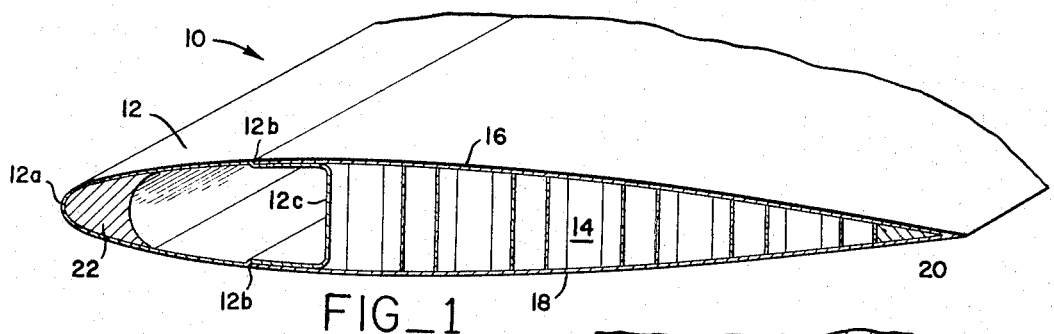
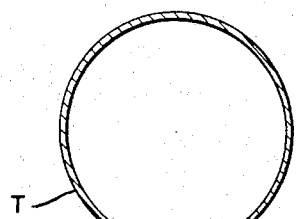
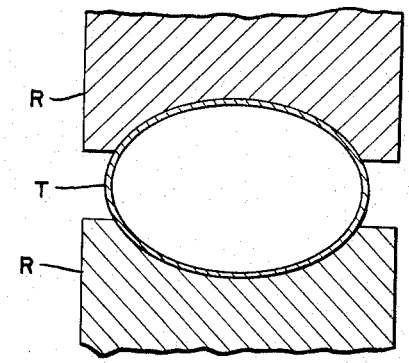
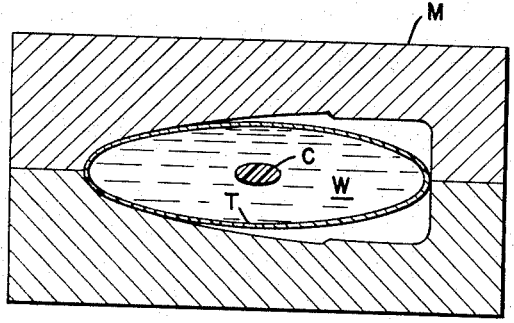
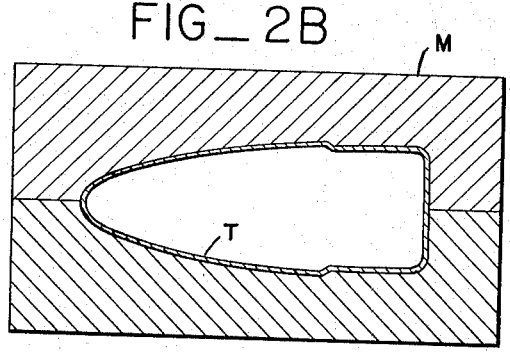
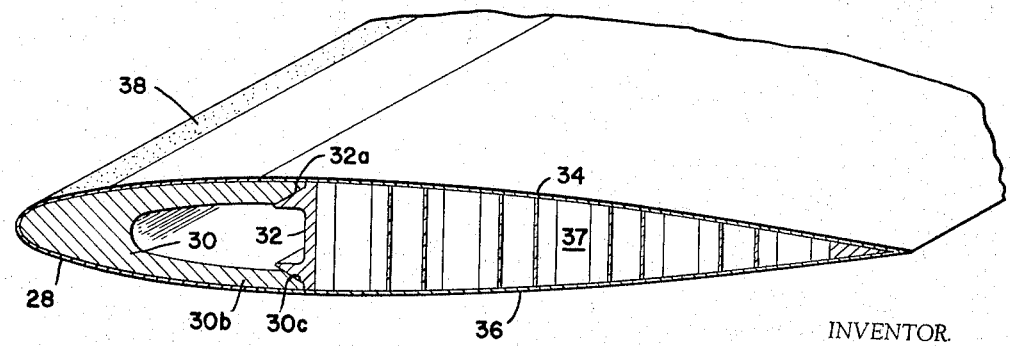
INVENTOR.
KENNETH KROHNCKE
BY Paul B. Fike
PATENT AGENT

United States Patent Office 3,372,757
Patented Mar. 12, 1968

3,372,757
ROTOR BLADE AND METHOD OF FABRICATING
THE SAME
Kenneth Krohncke, 919 S. 7th St.,
San Jose, Calif. 95112
Filed July 13, 1965, Ser. No. 471,545
1 Claim. (Cl. 170—159)

The present invention relates generally to rotor blades and more particularly to rotor blades for helicopters or the like and to the method of fabricating the same.

As is well known, helicopters employ rapidly revolving elongated blades as a lift mechanism. The blades, during their rotation about a central hub, are caused to vary in pitch in amounts dependent upon the desired lift characteristics. The blades are accordingly subject to centrifugal forces acting predominantly longitudinally of each blade and also to torsional forces resultant from the pitch variation. It has consequently been a necessary objective of helicopter blade design to meet the strength requirements to withstand such forces over an extended period of utilization. Regrettably, such objective has only been achieved to a limited degree and, moreover, has only been achieved by relatively complex and expensive structures.

Accordingly, it is a general object of the present invention to provide a relatively simple rotor blade structure which can be easily fabricated and yet provides excellent wear characteristics under extended use.

Obviously related to this general objective is a novel method of fabricating such rotor blades.

It is a particular feature of the invention to provide a rotor blade having a novel spar structure of tubular configuration which is simple to fabricate and readily withstands the generated centrifugal forces.

In accordance with one aspect of the invention, such spar structure is formed in a novel fashion from initially circular metal tubing, preferably composed of stainless steel so as to provide excellent strength and wear characteristics.

In accordance with a modified aspect of the invention, such spar is formed in the same general tubular configuration but by two extruded sections of aluminum designed to facilitate the extrusion process yet enabling assembly in a simple yet secure finally integrated structure.

Additionally, it is a feature of the invention to provide a rotor blade having a spar structure formed to provide the leading edge of the rotor blade and arranged to readily accommodate the structural skin elements forming the trailing edge of the blade.

When such spar structure is formed from aluminum, it is an additional feature to provide an abrasive-resistant layer bonded to its leading edge.

Additionally, it is a feature of the invention to provide a rotor blade enabling the secure attachment of a filler material to the spar and between the aforementioned structural skins in a fashion to minimize weight of the blade but at the same time maximize resistance to the torsional stresses produced by the varying pitch of the rotor blade.

These as well as other objects and features of the invention will become more apparent from a perusal of the following description of the structures illustrated in the accompanying drawing wherein:

FIG. 1 is a fragmentary perspective view of a rotor blade embodying the present invention, the endwise portion of the blade being shown in section, FIGS. 2a, 2b, 2c, and 2d are a series of views diagrammatically illustrating steps in the production of the spar member of the blade shown in FIG. 1, and FIG. 3 is a fragmentary perspective view similar to FIG. 1 illustrating a modified embodiment of the invention.

With initial reference to FIG. 1, the rotor blade 10 is an elongated structure which extends from its root end (not shown) mounted to the hub of the rotor to an outmost tip end. Preferably as shown, no variance in cross-section of the blade 10 exists throughout its length between the root and tip ends so that any transverse cross-section will be substantially as shown in FIG. 1.

More particularly, the rotor blade 10 includes a spar 12 which preferably is composed of an integral, tubular member formed in a generally bullet-shaped cross-section with the nose of the bullet providing the leading edge 12a of the blade. From such leading edge 12a, the tube diverges in substantially a parabolic configuration rearwardly for more than half of its over-all length at which point the upper and lower portions of the tube are stepped inwardly a small amount as indicated at 12b. Thereafter, the tube 12 continues rearwardly and is then bent inwardly to form a joining web 12c at substantially the point of maximum thickness of the blade. As illustrated, the web 12c defines a substantially flat plane lying perpendicular to the plane defined by the entire blade 10.

Filler material, 14 preferably in the form of light metallic honeycomb with its cells parallel to the plane of the web 12c is glued or otherwise secured to the web at its forward extremity and extends rearwardly between upper and lower structural skins 16, 18 which are attached to the upper and lower depressed portions of the spar 12 rearwardly of the described steps 12b therein so as to extend rearwardly in a generally convergent path to eventually join and form the trailing edge of the blade. Immediately adjacent the trailing edge, a small, wedge-shaped insert 20, preferably of aluminum, enables glued connection of the upper and lower skins 16, 18 thereto. These structural skins, 16, 18 can be composed of aluminum or resinous material as commonly employed in known blade structures and have a thickness such that the upper surface of both the structural skins form a substantially continuous plane with the surface of the spar 12, thus to minimize aerodynamic turbulence and improve the lift characteristics of the blade.

In order to provide the proper weight distribution of the blade, a small metallic insert 22 is glued within the interior of the spar 12 behind its leading edge, and such insert preferably is tapered outwardly toward its rearmost point of attachment to the encampassing spar, such tapered configuration serving to distribute any stresses.

It is to be observed that the structure is quite simple and of relatively light weight. Yet, it is capable of withstanding both the centrifugal and torsional forces experienced during flight. More particularly, the integrated tube forming the spar 12 can be of relatively thin material, stainless steel tubing having a wall thickness of about 0.050 inch being preferred because of its capacity to withstand centrifugal forces and also to provide an excellent abrasive-resistant leading edge 12a so that blade life in excess of one thousand (1,000) hours can be expected. Additionally, an extensive surface area is available on the spar 12 for attachment both of the upper and lower structural skins, 16, 18 and the forward portion of the honey-comb filler material 14. Thus, the juncture of the latter elements to the spar 12 enables the blade to withstand the experienced torsional forces without utilization of additional coupling elements.

The described spar 12 is preferably formed by the following sequence of steps as depicted in FIGS. 2A through 2D, inclusive. Initially, as shown in FIG. 2A, the structure from which the spar is formed constitutes a simple stainless steel tube T of circular cross-section and having approximately the desired wall thickness of the finished spar. As a first step, the stainless steel tube T is passed through one or more series of rollers R or forming dies as diagrammatically illustrated in FIG. 2B to squeeze or deform the tube from its initial circular cross-section to a flattened, substantially elliptical cross-section. An intermediate step of such rolling of the tube T is illustrated in FIG. 2B to effect a parial squeezing and flattening thereof and a subsequent rolling operation will further flatten the tube into the elliptical configuration illustrated in FIG. 2B to effect a partial squeezing and flattening a mold M diagrammatically illustrated in FIG. 2C whose interior wall surface has the bullet-shaped configuration of the desired spar shape. The ends of the elliptical tube T are open and the tube is filled with water as indicated at W and a length of explosive cord C such as "Prima Cord" manufactured by Hercules Powder Company is positioned centrally within the tube T. The explosive cord C is ignited and effects an expansion of the elliptical tube into the bullet-shaped conformation within the mold M as clearly illustrated in FIG. 2D. The requisite spar configuration is obtained without any excessive stresses on the stainless steel tubing and an integral structural spar of maximal strength and wear characteristics is thus readily produced. While the explosive technique is preferred, other expansion methods such as the application of hydraulic or pneumatic pressure interiorly of the tube T can be utilized.

Thereafter, the balancing insert 22 is mounted within the spar 12 and affixed thereto with an epoxy glue and the structural skins 16, 18 and the honey-comb filler 14 are similarly glued to the spar 12 and also to the trailing edge insert 20. All of these glueing operations can take place simultaneously by mounting the entire structure within a suitable jig and then heating the entire structure to approximately 350° constituting the normal temperature for curing epoxy glues of the desired characteristics. One excellent epoxy glue for this purpose is sold by Shell Oil Company under No. 927.

Whereas the tubular spar 12 shown in FIG. 1 is formed by a single piece of stainless steel tubing, in accordance with a modified aspect of the invention, the spar indicated at 28 can be of tubular configuration but formed from two sections 30, 32 of aluminum which can be extruded to the desired cross-sectional shapes as shown in FIG. 3. The one section 30 is of generally parabolic configuration having steps 30a on its upper and lower exterior surfaces for reception of structural skins 34, 36 much in the fashion of the first embodiment of the invention. At each of the two extremities of the parabolic section 30, a short rectangular portion 30b extends inwardly to a reverse flared portion 30c which is adapted to register with parallel flared flange portions 32a on the second spar section 32 which essentially constitutes a web joining the two ends of the parabolic first section 30, thus to provide an enclosed tubular spar. The two sections 30, 32 are assembled by applying epoxy glue between the flared surfaces of the two sections, the rectangular end 30b of the parabolic section serving to preclude excessive pressure between the two sections during the application and curing of the epoxy glue.

After the two-section aluminum spar 28 has been assembled in the described fashion, the structural skins 34, 36 and a honey-comb filler 37 are secured thereto in a fashion similar to that described in conjunction with the first embodiment of the invention. It is to be specifically observed that the parabolic section 30 of the aluminum spar 28 can be formed so that the desired balancing weight of the finished blade is achieved without any additional inserts being employed.

In view of the fact that the tubular spar 28 in the second embodiment of this invention is formed of aluminum, it is preferred to apply an abrasive resistant layer to the leading edge thereof. Preferably, such layer, indicated at 38, takes the form of an abrasive resistant resin such as that sold under the trade name "Scotchkote" which may be sprayed thereon and cured at 350° Fahrenheit at the same time that the curing of the epoxy glues is taking place. The layer 38 is consequently bonded to the aluminum to be integral therewith.

It will be seen from the foregoing that both described embodiments contain a minimal number of parts and are capable of being assembled with a minimal number of steps. It will be obvious that other modifications can be envisioned without departing from the spirit of the invention, and the foregoing structures and the method of their assembly is to be considered purely exemplary and not in a limiting sense. The actual scope of the invention is to be indicated only by reference to the appended claim.

What is claimed is:
1. The method of fabricating a rotor blade which comprises the steps of:
   squeezing an initially circular tube into a flattened generally elliptical cross section,
   supporting the elliptical tube in a mold having surfaces corresponding to a desired bullet-shaped configuration of the rotor blade spar,
   exploding interiorly of the tube to expand the same into contact with the mold to form the spar of the blade, and
   attaching rearwardly converging skins to the spar to form the trailing edge of the blade,
   the ends of the elliptical tube being open and the tube being supported under water during the explosion step,
   and finally securing a tapered balance weight to the wall surfaces of the formed spar.

References Cited

UNITED STATES PATENTS

| | | | |
|---|---|---|---|
| 2,630,868 | 3/1953 | Ellenberger | 170—159 |
| 2,644,537 | 7/1953 | Meyers | 170—159 |
| 2,754,918 | 7/1956 | Gluhareff | 170—159 |
| 2,771,144 | 11/1956 | Lasserre et al. | 170—159 |
| 2,941,603 | 6/1960 | Jovanovich | 170—159 |
| 3,045,339 | 7/1962 | Callahan | 29—421 |
| 3,168,144 | 2/1965 | Capowich et al. | 170—159 |
| 3,217,807 | 11/1965 | Underhill et al. | 170—159 |

FOREIGN PATENTS

| | | |
|---|---|---|
| 1,009,798 | 3/1952 | France. |
| 644,181 | 10/1950 | Great Britain. |

EVERETTE A. POWELL, Jr., *Primary Examiner.*

MARTIN P. SCHWADRON, *Examiner.*